United States Patent [19]

Hashiguchi

[11] Patent Number: 5,181,206

[45] Date of Patent: Jan. 19, 1993

[54] PROM WRITER HAVING CHECK SUM FUNCTION

[75] Inventor: Ryoji Hashiguchi, Tokyo, Japan

[73] Assignee: Ando Electric Co., Ltd., Tokyo, Japan

[21] Appl. No.: 549,343

[22] Filed: Jul. 6, 1990

[30] Foreign Application Priority Data

Jul. 12, 1989 [JP] Japan ................. 1-179762

[51] Int. Cl.⁵ ................. G06F 11/10; G11C 29/00
[52] U.S. Cl. ................. 371/21.5; 371/69.1
[58] Field of Search ................. 371/21.5, 69.1, 13

[56] References Cited

U.S. PATENT DOCUMENTS

| | | | |
|---|---|---|---|
| 3,582,880 | 6/1971 | Beausoleil | 371/69.1 |
| 4,133,504 | 1/1979 | Dobler et al. | 371/69.1 |
| 4,355,390 | 10/1982 | Hellwig et al. | 371/21.5 |
| 4,404,677 | 9/1983 | Grande et al. | 371/69.1 |
| 4,519,077 | 5/1985 | Amin | 371/21.5 |
| 4,646,307 | 2/1987 | Nishimura | 371/21.5 |
| 4,698,808 | 10/1987 | Ishii | 371/21.5 |
| 4,727,544 | 2/1988 | Brunner et al. | 371/21.5 |
| 4,807,186 | 2/1989 | Ohnishi et al. | 371/21.5 |
| 4,959,836 | 9/1990 | Berard et al. | 371/69.1 |

*Primary Examiner*—Charles E. Atkinson
*Attorney, Agent, or Firm*—Seidel, Gonda, Lavorgna & Monaco

[57] ABSTRACT

The present invention relates to a PROM writer which functions to compare the first check sum value of the first or reference data read out a master ROM with the check sum values of the second and subsequent data from the master ROM. The data read out of the master ROM is written into the plurality of the blank ROMs and the present invention prevents wrong data from being written into the blank ROMs based on a failure of a successful comparison between the first check sum value and the second and subsequent check sum values.

2 Claims, 3 Drawing Sheets

PROM WRITER HAVING CHECK SUM FUNCTION

TECHNICAL FIELD

The present invention relates to a PROM writer having a check sum function, and more particularly, relates to a PROM writer which functions to compare the check sum value of the first data of a master ROM, from which the data to be written is read out and written into a plurality of blank ROMs, with the check sum value of the second and subsequent data to be written into a plurality of blank ROMs and to prevent wrong data from a faulty master ROM from being written into the blank ROMs.

PRIOR ART

The conventional PROM writer will be first explained in reference to FIG. 2 of the attached drawings, wherein 1 is a master ROM, 2 is a controller, 3 is a CPU, 4 is an indicator or display, 11 is a data bus, and 12 is a control signal bus. There are a plurality of blank ROMs 1A-1N.

The master ROM 1 has a check sum value of 1234(in hexadecimal (H)), for example, written therein and the blank ROMs 1A-1N used are the same as the master ROM except that they are blank or erased.

The data of the master ROM 1 is written into the blank ROMs 1A-1N by way of the data bus 11.

The controller 2 is controlled by the CPU 3 and controls the master ROM 1 as well as the control signal bus 12 for the blank ROMs 1A-1N so that the data from the master ROM 1 are written into the ROMs 1A-1N.

The data of the master ROM 1 is read out by the controller 2 and the check sum value of the data of the master ROM 1 is calculated in the CPU 3 and such values are displayed by the indicator 4.

The term "check sum value" used herein means a sum of data. For example, if the data written in the master ROM 1 are 1, 2, 3, 4 and 5 (total of 15), the check sum value is 0F(H).

THE PROBLEM TO BE SOLVED BY THE INVENTION

The PROM writer illustrated in FIG. 2 has a drawback that there is a possibility that wrong data from a faulty master ROM is written into the blank ROMs 1A-1N, unless the operator has a correct value to be referenced against the check sum value because the check sum value indicated on the indicator 4 is that of the master ROM 1, but not necessarily a correct one.

Accordingly, a principal object of the present invention is to provide a PROM writer which is capable of preventing such an error by issuing an alarm when there is even a possibility of writing wrong data into the blank ROMs.

BRIEF SUMMARY OF THE INVENTION

The present invention provides a PROM writer which is capable of detecting an abnormality of a master ROM. The PROM writer functions to calculate a check sum value X from the first read data of the master ROM, calculate check sum value from the second and subsequent data from the master ROM 1, to compare the first check sum value with those of the second, and to subsequent data and issue an alarm if the first value X is different from the second or subsequent check sum value.

More particularly, the present invention provides a PROM writer for writing data stored in a master ROM 1 into a plurality of blank ROMs 1A-1N. The PROM writer includes a controller 2 for reading the stored data out of the master ROM 1 and for controlling a control signal bus 12 between the master ROM and the blank ROMs 1A-1N, a CPU 3 for controlling the flow of data read out by the controller 2 from the master ROM 1 and for controlling check sum values calculated for said data, and an indicator 4 for indicating the check sum values. The PROM writer is characterized in that it includes a first calculator means 5 for calculating a check sum value X of the first data read out by the controller 2 from the master ROM 1, memory means 6 for storing the first check sum value X and classifies such as check sum value Y, second calculator means 7 for calculating check sum values X of the second and subsequent data read out by the controller 2 from the master ROM 1, comparator means 8 for comparing the check sum value Y with the second and subsequent check sum values X, successively, and alarming means 9 for issuing an alarm upon receipt of a non-coincident signal outputted from the comparator means 8.

DETAILED EXPLANATION OF A PREFERRED EMBODIMENT

A preferred embodiment of the PROM writer according to the present invention will be explained in detail in reference to FIG. 1.

Figure 1:
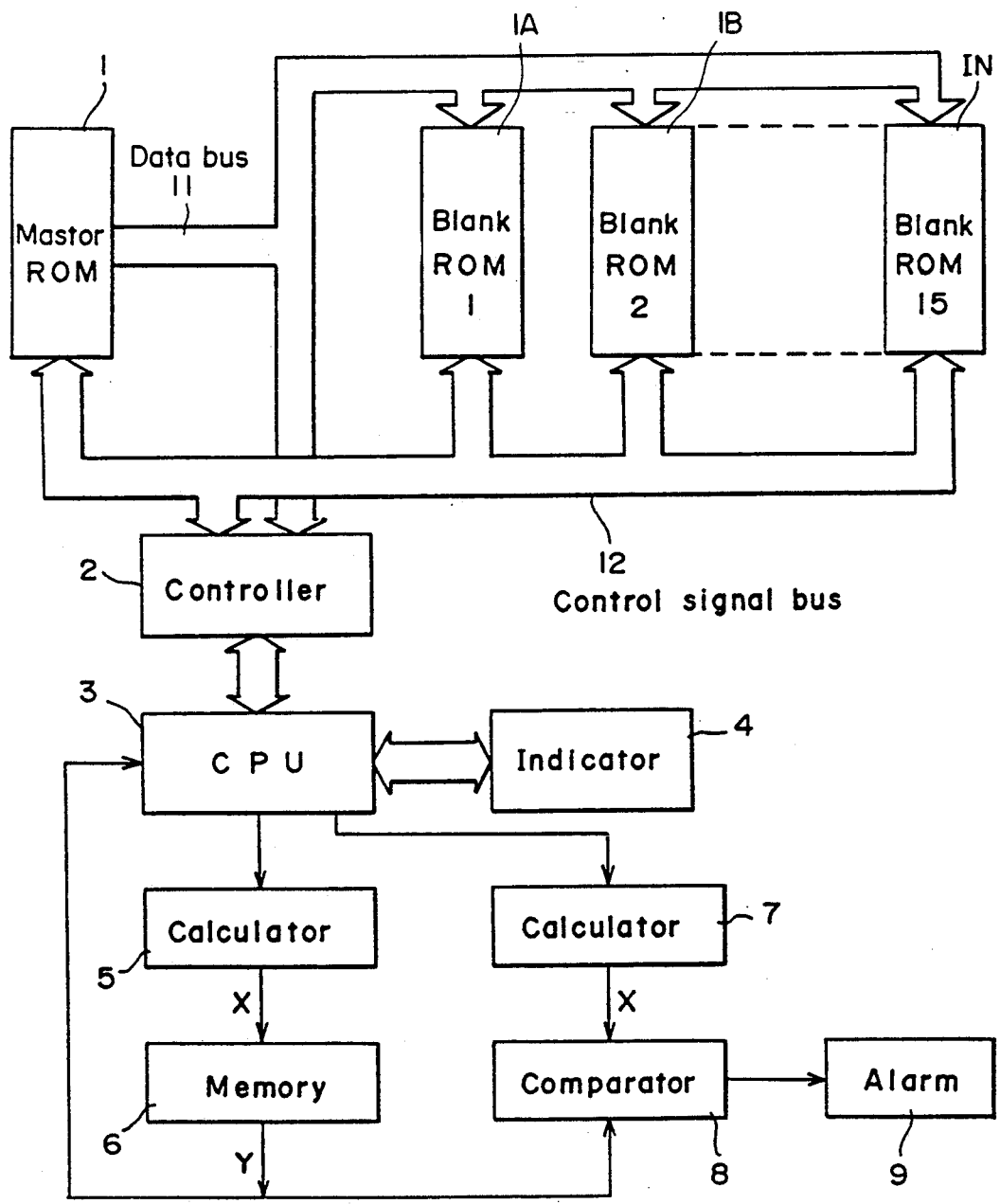
FIG. 1 illustrates a block diagram of a PROM writer according to the present invention.

An important feature of the present invention, to be more fully described, is that the data stored in the master ROM of FIG. 1 and which stored data is first or initially read out therefrom, is treated or considered as being the correct or referenced data to which all the subsequent data read out of the master ROM are compared thereto. The initial data of the master ROM is considered to be correct because the master ROM itself and its contents are checked prior to the master ROM being arranged within the PROM writer of FIG. 1. The accuracy of this initial or referenced data of the master ROM is further enhanced by performing a check sum on its contents. As used herein, if the check sum for the data subsequently read out of the master ROM does compare exactly with the check sum of the initial data read out of the master ROM, then that subsequent data is termed "correct data" and, conversely, if such a check sum of the subsequent data does not compare with the check sum of the initial data read out of the ROM, then that subsequent data is termed "wrong data."

Figure 2:
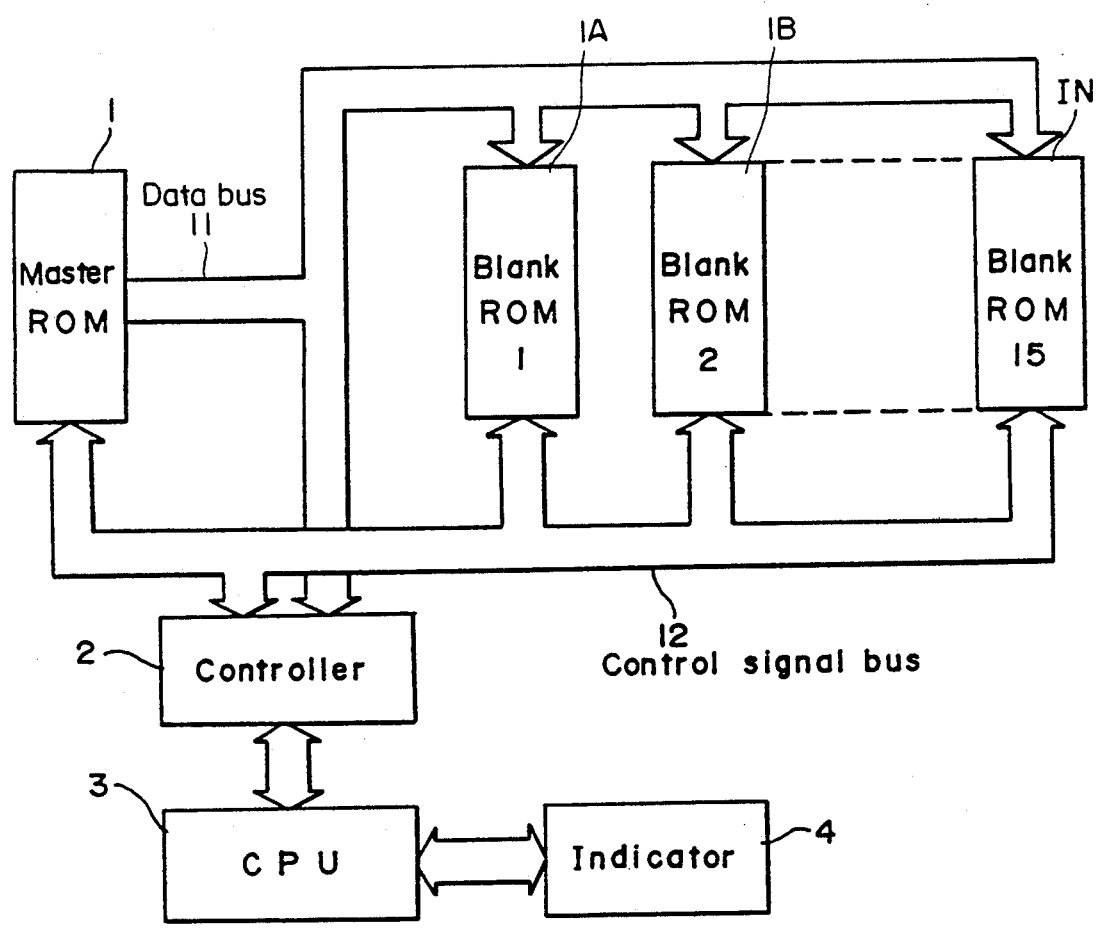
FIG. 2 is a block diagram of the conventional PROM writer.

In FIG. 1, the portions similar to those of the PROM writer shown in FIG. 2 are indicated by the similar reference numerals and detailed explanation of such similar portions are herein omitted.

The PROM writer further includes a first calculator means 5 for calculating a check sum value of the first or reference data read out by the controller 2 from the master ROM 1, a memory means 6 accepting the output of calculator 5 and storing the first check sum value and classifying such as check sum value Y a second calculator means 7 for calculating check sum values X of the second and subsequent data read out by the controller 2 from the master ROM 1, a comparator means 8 accepting the outputs of the memory means 6 and calculator means 7 and comparing the check sum value Y of the reference data with the second and subsequent check sum values X, successively, and alarming means 9 for issuing an alarm upon receipt of a non-coincident signal representative of a difference between the check sum value Y and any of the second and subsequent check sum values X and which signal is outputted from the comparator means 8.

The calculating means 5 is controlled by CPU 3 to derive a check sum value X from the first or reference data read out by the controller 2 from the master ROM 1.

The memory means 6 stores the check sum value X and classifies such as check sum value Y. This check sum value Y is derived from the reference or correct data that is first read out of the master ROM, and is used for error checking purposes to verify that the check sum value subsequent data read out of the ROM is "correct," that is, consistent with and the same as the check sum of the first data, or "wrong," that is, it is inconsistent with and not the same as the check sum of the first data.

The calculator means 7 calculates check sum values X of the second and subsequent data from the master ROM 1.

The comparator means 8 compares the check sum value Y with the check sum values X of the second and subsequent data, successively, and supplies an error signal if any of the check sum values X of the second and subsequent data is different from the check sum value Y.

Operation

Figure 3:
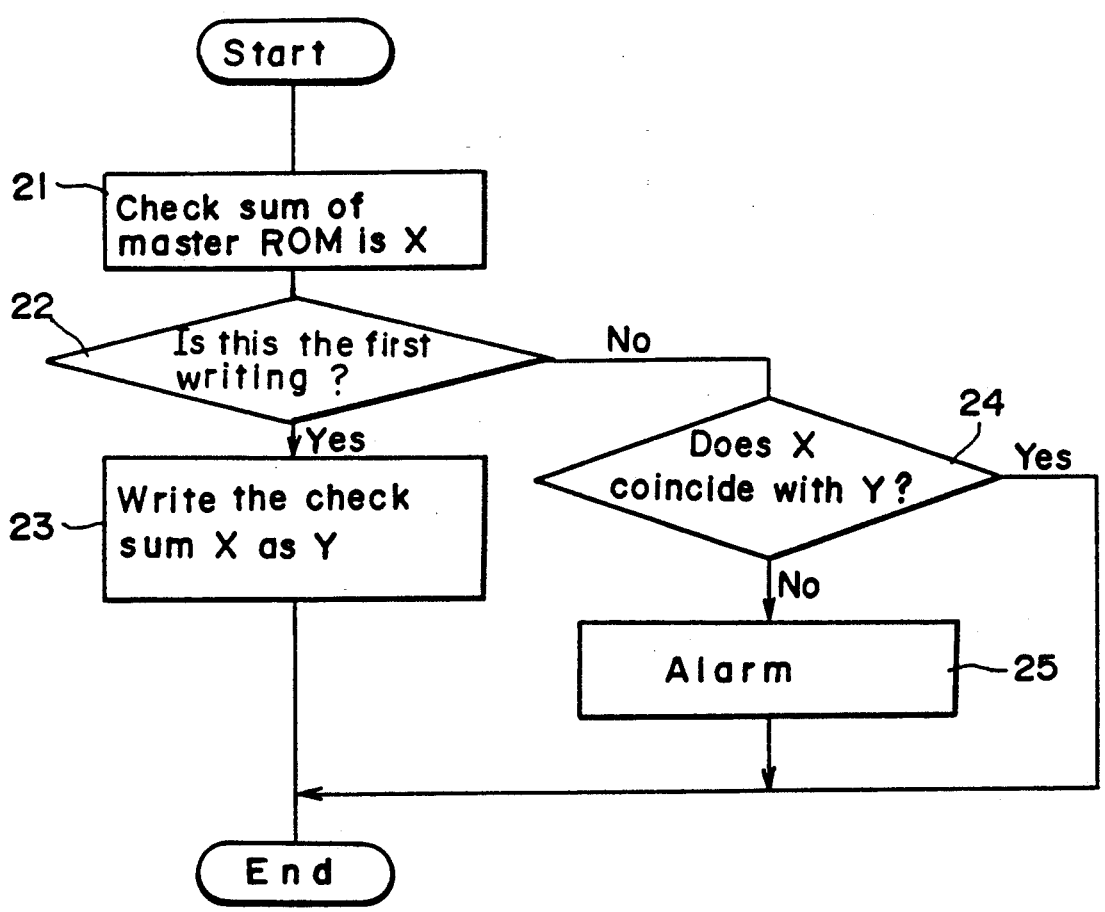
FIG. 3 is a flow diagram for the writer in FIG. 1.

Flow diagram for the circuit arrangement of FIG. 1 is shown in FIG. 3. The illustrated step 21 corresponds to the operation of the calculator means 5 and 7 and the check sum value of the master ROM 1 is termed X in illustrated step 21.

In the step 22, a decision is made as to whether or not the writing being accomplished by the circuit arrangement of FIG. 1 is related to the first data read out of the master ROM and if this decision is yes, the check sum value X of calculator means 5 is stored in the memory means 6 as check sum value Y.

From the second writing (answer to decision black 22=no), the check sum value X is compared in the step 24 with the check sum value Y, and if X≠Y an alarm is issued in the step 25.

In its operation, the calculator means 5 sums up the data of the master ROM 1 to obtain a first check sum value as a value representative of the data of the master ROM 1. This first check value is assumed to be correct even when there is no reference value for the master ROM data. The calculator means is required to confirm, that is, to obtain a first sum check of the data of master ROM 1 and treat such as being correct.

The comparator means 8 compares the first check sum value stored in the memory means 6 classified as check sum value Y with the check sum values X calculated from the second and subsequently read out data of the master ROM 1. If the stored check sum value X is different from any of the check sum values X of the second and subsequent data, such a difference indicates that wrong data is being read from a faulty master ROM 1 and the writing operation can be halted so as to minimize the possibility of writing wrong data from a faulty master ROM 1 into the blank ROMs 1A-1N.

According to the present invention, where data from a master ROM is to be written into a plurality of blank ROMs, it is possible to prevent wrong data from being written into blank the ROMs, because the check sum value X calculated from the first or reference data of the master ROM and classified as check sum value Y is stored and compared with check sum values X from the second and subsequent data read out from the master ROM, and if there is a discrepancy; i.e., a difference between the check sum value Y and any of the check sum values X an alarm is issued.

What is claimed is:

1. A PROM writer for writing data stored in a master ROM 1 into a plurality of blank ROMs 1A-1N by means of a data bus connected between the master ROM and the blank ROMs, characterized in that the writer comprises first calculator means 5 for calculating a check sum value X of the first data from the master ROM 1 serving as reference data, memory means 6 for storing the first check sum value X and classifying such as check sum value Y, second calculator means 7 for calculating check sum values X of the second and subsequent data from the master ROM 1, comparator means 8 for comparing the check sum value Y of the reference data with the second and subsequent check sum values X, successively, and alarming means 9 for issuing an alarm upon receipt of a non-coincident signal representative of a difference between the check sum value Y and any of the second and subsequent check sum values X and which signal is outputted from the comparator means 8.

2. A PROM writer for writing data stored in a master ROM 1 into a plurality of blank ROMs 1A-1N by means of a data bus connected between the master ROM and the blank ROMs, including a controller 2 for controlling a control signal bus 12 between the master ROM and the blank ROMs 1A-1N, a CPU 3 for controlling the flow of data read out by the controller 2 from the master ROM 1 and check sum values calculated for said data, and an indicator 4 for indicating the check sum values, characterized in that the writer includes first calculator means 5 for calculating a check sum value X of the first data serving as reference data read out by the controller 2 from the master ROM 1, memory means 6 for storing the first check sum value X and classifying such as check sum value Y, second calculator means 7 for calculating check sum values X of the second and subsequent data read out by the controller 2 from the master ROM 1, comparator means 8 for comparing the check sum value Y with the second and subsequent check sum values X, successively, and alarming means 9 for issuing an alarm upon receipt of a non-coincident signal representative of a difference between the check sum value Y and any of the second and subsequent check sum values X and which signal is outputted from the comparator means 8.

* * * * *